US012271377B2

(12) United States Patent
Bouvrie et al.

(10) Patent No.: US 12,271,377 B2
(45) Date of Patent: Apr. 8, 2025

(54) REDUCING LATENCY IN QUERY-BASED SEARCH ENGINES

(71) Applicant: Kayak Software Corporation, Stamford, CT (US)

(72) Inventors: Jacob Vincent Bouvrie, Arlington, MA (US); Michele Alberti, Bern (CH); Giorgos Zacharia, Winchester, MA (US)

(73) Assignee: KAYAK Software Corporation, Stamford, CT (US)

( * ) Notice: Subject to any disclaimer, the term of this patent is extended or adjusted under 35 U.S.C. 154(b) by 74 days.

(21) Appl. No.: 17/664,762

(22) Filed: May 24, 2022

(65) Prior Publication Data

US 2023/0409572 A1    Dec. 21, 2023

(51) Int. Cl.
*G06F 16/2453*    (2019.01)
*G06F 16/248*    (2019.01)
*G06Q 10/02*    (2012.01)

(52) U.S. Cl.
CPC ..... *G06F 16/24539* (2019.01); *G06Q 10/025* (2013.01); *G06F 16/248* (2019.01)

(58) Field of Classification Search
CPC ............ G06F 16/24539; G06F 16/248; G06Q 10/025
See application file for complete search history.

(56) References Cited

U.S. PATENT DOCUMENTS

| 6,418,413 | B2* | 7/2002 | DeMarcken | G06Q 30/0201 705/7.29 |
| 7,668,740 | B1* | 2/2010 | Baggett | G06F 16/24552 345/557 |
| 9,275,346 | B2* | 3/2016 | Zacharia | G06N 20/00 |
| 9,282,145 | B2 | 3/2016 | Wei et al. | |
| 9,536,522 | B1* | 1/2017 | Hall | G06F 16/3344 |
| 10,178,147 | B1 | 1/2019 | Kolam | |
| 2002/0133381 | A1* | 9/2002 | Tso | G06Q 10/02 705/5 |
| 2007/0192300 | A1* | 8/2007 | Reuther | G06F 16/2452 |

(Continued)

OTHER PUBLICATIONS

Altexsoft, "Airline Flight Booking APIs: GDSs, Specialized Data Providers, OTAs, and Metasearch Engines" <https://www.altexsoft.com/blog/airline-flight-booking-apis-gdss-specialized-data-providers-otas-and-metasearch-engines/> (Apr. 19, 2019). (Year: 2019).*

(Continued)

*Primary Examiner* — Jeff Zimmerman
*Assistant Examiner* — Brian A Tallman
(74) *Attorney, Agent, or Firm* — Lee & Hayes, P.C.

(57) ABSTRACT

Disclosed are methods, systems, and computer-readable medium to perform operations including: receiving a query specifying one or more criteria for a travel reservation, transmitting, over a network, one or more requests for live travel data satisfying the one or more criteria, determining one or more query results that satisfy the one or more criteria, retrieving cached travel data for at least one of the one or more query results, and while responses to the one or more requests for live travel data are still being received over the network, generating, using a prediction engine, live travel data predictions for the one or more query results based at least in part on the cached travel data.

20 Claims, 6 Drawing Sheets

(56) References Cited

U.S. PATENT DOCUMENTS

| | | | |
|---|---|---|---|
| 2008/0167973 A1* | 7/2008 | De Marcken | G06Q 10/025 705/5 |
| 2013/0024404 A1* | 1/2013 | Zacharia | G06Q 10/02 706/12 |
| 2016/0227258 A1 | 8/2016 | Zhang | |
| 2017/0228424 A1* | 8/2017 | Ck | G06F 16/24552 |
| 2019/0042988 A1* | 2/2019 | Brown | G06F 16/9535 |

OTHER PUBLICATIONS

Poggi, Nicolas, et al. "A methodology for the evaluation of high response time on E-commerce users and sales." Information Systems Frontiers 16 (2014): p. 867-885. (Year: 2014).*

* cited by examiner

REDUCING LATENCY IN QUERY-BASED SEARCH ENGINES

TECHNICAL FIELD

The present disclosure generally relates to techniques for reducing the latency between a query and the return of query results in query-based search engines.

BACKGROUND

Users often leverage search engines to discover information about products or services that they are interested in. For example, a user may query a travel search engine to obtain information about flights, hotels, rental cars, or other travel-based services. Some travel search engines are able to provide current price and other information to users based on the search queries they initiate. Depending on the search query, the travel search engine may take a long time to return search results to a user. This results from the fact that there are multiple databases associated with travel service providers that must be queried each time a user initiates a search.

SUMMARY

The present disclosure uses predictive techniques, alone or in combination with cached or live data, to reduce the latency between a query and the return of a query result in query-based searched engines.

In general, in an aspect, a computer-implemented method includes receiving a query specifying one or more criteria for a travel reservation, transmitting, over a network, one or more requests for live travel data satisfying the one or more criteria, determining, by at least one processor, one or more query results that satisfy the one or more criteria, retrieving, by the at least one processor, cached travel data for at least one of the one or more query results, and while responses to the one or more requests for live travel data are still being received over the network, generating, using a prediction engine, live travel data predictions for the one or more query results based at least in part on the cached travel data.

Other versions include corresponding systems, apparatus, and computer programs configured to perform the actions of methods defined by instructions encoded on computer-readable storage devices. These and other versions may optionally include one or more of the following features.

In some embodiments, determining the one or more query results that satisfy the one or more criteria includes querying a schedule of travel reservations based on the one or more criteria.

In some embodiments, retrieving the cached travel data for the at least one query result includes retrieving the cached travel data stored in association with a unique identifier for the at least one query result. In some embodiments, retrieving the cached travel data for the at least one query result includes retrieving the cached travel data stored in association with at least some of the one or more criteria.

In some embodiments, the prediction engine includes at least one machine learning model configured to receive the one or more query results and the cached travel data as inputs and generate the live travel data predictions as an output. In some embodiments, the prediction engine is configured to generate a confidence score for each of the live travel data predictions, the live travel data predictions having a confidence score below a threshold value are filtered.

In some embodiments, the one or more query results and the live travel data predictions are transmitted to a client device for presentation to a user. In some embodiments, the responses to the one or more requests for live travel data are received, and the live travel data included in the responses is transmitted to the client device for presentation to the user.

In some embodiments, the live travel data is stored in association with the one or more query results in cache.

In some embodiments, a first response to the one or more requests for live travel data satisfying the one or more criteria is received, and while responses to others of the one or more requests for live travel data are still being received, live travel data predictions for the one or more query results are generated using the prediction engine and based at least in part on the live travel data included in the first response.

In some embodiments, the live travel data predictions for the one or more query results include at least one of a predicted price, a predicted provider, or a predicted availability for the travel reservation.

BRIEF DESCRIPTION OF THE DRAWINGS

Like reference numbers and designations in the various drawings indicate like elements.

DETAILED DESCRIPTION

Figure 1:
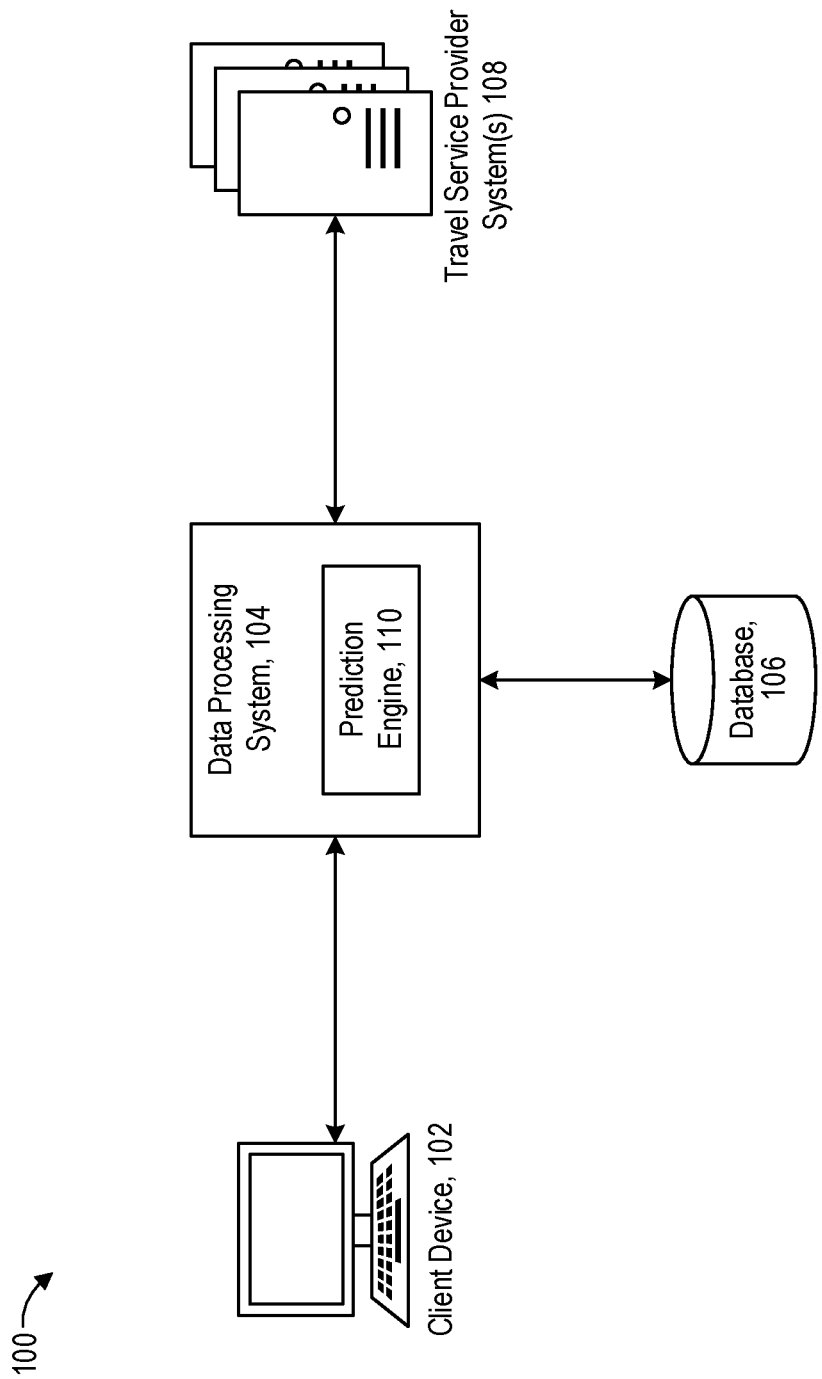
FIG. 1 illustrates an example system, in accordance with some embodiments.

For users, determining the best or lowest price for a product or service is often a top priority. The price of a product or service may be affected by several factors and may change over time. As an example, in the case of flight reservations, pricing is dependent on a number of different variables, including departure date, arrival date, number of layovers, flight duration, availability, airline, and baggage allowance, among others. Moreover, the prices among flights can vary greatly depending on the season, events scheduled at the destination, and the like. Because of these variables, users are unable to predict prices (or other information) for the flight reservations they seek. As a result, users resort to obtaining pricing information from individual providers and comparing these prices to identify the reservation which meets their needs, which consumes a significant amount of time.

To address these concerns, some web-based travel agencies provide search engines that enable users to request live prices, providers, and other information for travel-related services from a single interface. To provide this information, the search engine accesses multiple disparate provider databases to obtain live (e.g., current, real time, or near-real time) pricing and other information for the requested services. However, some providers limit the ability of the search engine to access live information in order to, for example, reduce network load. Even when the search engine is able to obtain live information from a provider, it can take a non-negligible amount of time to query each provider database for the desired information and receive the query results for presentation to a user. As a result, the travel agencies may not be able to provide pricing and other requested information to users with sufficient accuracy in a timely manner.

The technology described herein uses predictive techniques, alone or in combination with cached or live data, to quickly estimate prices and other information for travel reservations in response to a user query. The predicted information (or a subset thereof) is presented to the user using any of a variety of textual and/or graphical representations, thereby providing the user with a seemingly instantaneous response to their query. The predicted information presented to the user can then be updated with live data as it is received. In this manner, the techniques described herein considerably enhance the user's experience, as the user is provided accurate information for the reservations they seek without the need to wait for receipt of query results from disparate providers.

Reference will now be made in detail to the disclosed embodiments, examples of which are illustrated in the accompanying drawings. While the following discussion relates to reducing latency in traveled-based searches, discussion of these services and environments are made by example only. It should be appreciated that the present disclosure is not limited to these specific embodiments and details. It is further understood that one possessing ordinary skill in the art would appreciate the use of the embodiments of the present disclosure for their intended purposes and benefits in any number of alternative embodiments, depending on specific design and other needs. The techniques discussed here may be applicable in other environments that may benefit from reducing the latency between a query and the return of query results.

FIG. 1 is a block diagram of an exemplary system 100 configured to perform one or more operations consistent with disclosed embodiments. In this example, the system 100 includes one or more client device(s) 102, one or more web based data processing system(s) 104, one or more database(s) 106, and one or more travel service provider systems(s) 108. In some embodiments, the system 100 may include other components that perform or assist in the performance of one or more processes consistent with the disclosed embodiments. Some or all of the components of the system 100 may be communicatively coupled using any combination of wired and/or wireless networks.

The client device 102 may be a computing device (e.g., a laptop, a mobile phone, etc.) configured to communicate with the data processing system 104 to provide user queries and receive query results. In some embodiments, the client device 102 may include one or more software applications executing thereon that enable the client device 102 to communicate with the data processing system 104 over a network to perform aspects of the disclosed techniques. For example, the client device 102 may connect to the data processing system 104 through the use of a web browser or custom application to send and/or receive data from the data processing system 104.

The data processing system 104 can include one or more servers or other computing devices configured to receive a query from the client device 102 and provide query results in response. To generate the query results, the data processing system 104 can include a prediction engine 110 configured to predict travel data based on the received query alone or in combination with cached travel data from the database 106 and/or live travel data from the one or more travel provider system(s) 108, as described in detail below. Once generated, the query results can be communicated to the client device 102 for presentation to the user (e.g., via a browser or dedicated application).

The database 106 can include one or more hardware storage devices configured to store travel data and other information that is accessed and/or managed by one or more components of the system 100. In some embodiments, the database 106 can include computing components (e.g., a database management system, a database server, etc.) configured to receive and process requests for data stored in the database 106. In some embodiments, the data processing system 104 periodically updates the database 106 based on, for example, data generated in response to queries from the client device 102 and/or data received from the travel service provider systems(s) 108.

Figure 2A:
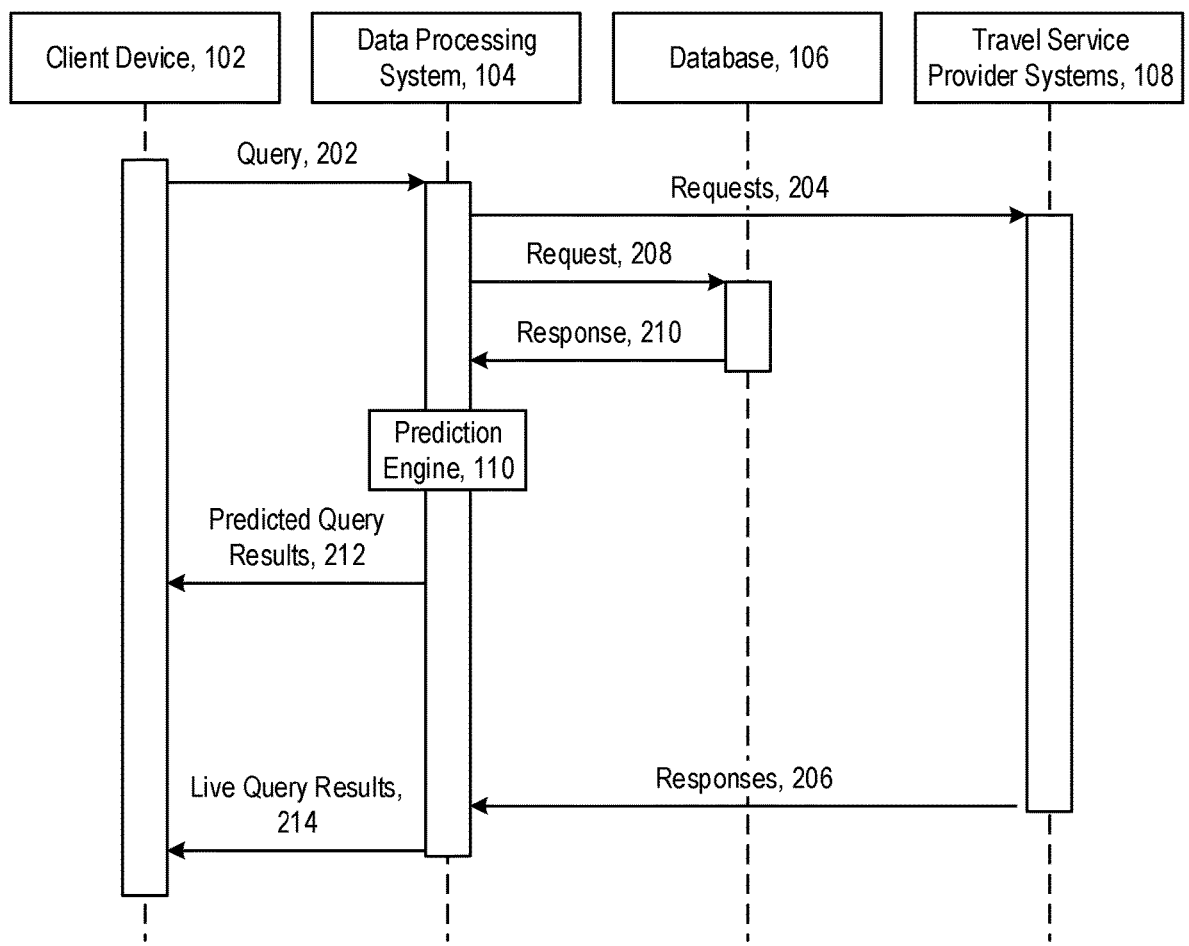
FIGS. 2A and 2B illustrate example processes, in accordance with some embodiments.

FIG. 2A illustrates an example process 200 for reducing latency in query-based search engines, in accordance with an aspect of the present disclosure. In this example, the client device 102 sends a query 202 to the data processing system 104. The query 202 can include query attributes with values defining one or more conditions or criteria for the results to be returned by the data processing system 104. In some embodiments, the attributes and values that form the query 202 may be entered by a user of the client device 102 via a user interface in communication with the data processing system 104. As a non-limiting example, the query 202 can be a query for a flight, and the query attributes and associated values can include one or more of a departure city, a destination city, a departure airport, a destination airport, a departure date, a return date, a date range, traveler information (e.g., total number of passengers, number of adults, number of children, etc.), a travel class (e.g., economy, premium economy, business, first, etc.), trip options (e.g., one way trip, round trip, multi-city trip, etc.), or baggage information (e.g., number of carry-on bags, number of check-in bags, etc.), among other information.

Once received, the data processing system 104 processes the query 202 to identify the query attributes and their associated values. Using this information, the data processing system 104 generates one or more requests 204 to one or more of the travel service provider systems 108 for live travel data. In some embodiments, a request 204 can be a call to an application programming interface (API) of a travel service provider system 108. Each of the travel service provider systems 108 process the received requests 204 and return one or more responses 206 with live travel data that satisfies the query 202. The term "live travel data" refers broadly to current, real time, or near-real time information for a travel-related product or service. For example, in the context of flights, live travel data can include flight information that is subject to change over time, such as flight price, flight provider, and/or availability (e.g., number of seats), as well as other flight-related information including departure airport, destination airport, departure date/time, arrival date/time, flight time, flight number, or combinations of them, among others.

Due to factors such as processing delay and propagation delay, it may take a non-negligible amount of time (e.g., between 1 and 30 seconds or more) for the data processing system 104 to receive the responses 206 with the requested live travel data. As a result, the user of the client device 102 may experience a significant delay between initiation of the query 202 and receipt of query results based on the live travel data.

To improve the speed with which query results are provided to the user, the data processing engine 104 can employ a prediction engine 110 configured to generate predictions for the live travel data before it is received. In general, the prediction engine 110 can include one or more machine learning models trained to predict live travel data (e.g., current flight price, flight provider, availability, etc.) for a given input, such as a given flight or set of flights. As a non-limiting example, the prediction engine 110 can include one or more convolutional neural networks, deep neural networks, recurrent neural networks, or combinations of them, although other types of predictive models can be used without departing from the scope of the present disclosure. The prediction engine 110 can be trained on historical travel data, such as data regarding past flights and their prices, providers, and availability, among other information, that is stored in the database 106, received from the travel service provider systems 108, or otherwise accessible to the prediction engine 110. In some embodiments, the prediction engine 110 can be retrained over time as additional queries and travel data are received.

In order to obtain the set of flights to be processed by the prediction engine 110, the data processing system 104 can query a database 106 storing a worldwide schedule of flights. For example, the data processing system 104 can generate a request 208 based on the query 202, and can transmit the request 208 to the database 106. In some embodiments, the request 208 is transmitted in parallel (or substantially in parallel) with the requests 204. In some embodiments, the database 106 storing the flight schedules can be a third party database, such as those provided by Innovata™ or Cirium™, and the request 208 can be an API call to the database 106. Upon receipt of the request 208, the database 106 can provide a response 210 with information for flights that satisfy the query 202. For example, in some embodiments, the response 210 provided by the database 106 can include a list of flights satisfying the query 202, along with their departure airport, destination airport, departure date/time, arrival date/time, flight number, carrier, or combinations of them, among other information. In this way, the data processing system 104 can quickly build an initial set of flights that satisfy the query 202 (sometimes referred to as results for the query 202) without relying on the responses 206 from the travel service provider systems 108.

Each of the results obtained from the database 106 are then processed by the prediction engine 110 to predict the price, provider, availability, and/or other live travel data for each result. In some embodiments, the prediction engine 110 can also use cached travel data stored in the database 106 and/or early live travel data responses 206 to generate the predictions, as described in detail below. In some embodiments, the prediction engine 110 can produce a confidence score representing a level of accuracy for each prediction. Such a confidence score can range between, for example, 0 and 1, with 0 representing low confidence in the accuracy of the prediction and 1 representing high confidence in the accuracy of the prediction.

The data processing system 104 uses the results and the predicted live travel data to produce a set of predicted query results 212 that are sent to the client device 102. In some embodiments, the data processing system 104 can choose to provide a prediction with the query result 212 only when the confidence score associated with the prediction is above a threshold level (e.g., a confidence score greater than or equal to about 0.5 on the aforementioned scale). Upon receipt of the predicted query results 212, the client device 102 can present the results 212 to the user using any of a variety of graphical and/or textual representations. In some embodiments, the data processing system 104 (or the client device 102) can sort the results 212 for presentation at the client device 102 based on, for example, a lowest predicted price, shortest travel duration, or lowest number of stops, among other features. In some embodiments, the results 212 are actionable such that selection of the result (or a user interface element associated with a result) navigates the user to an interface for booking the flight with the predicted provider. If a provider prediction is unavailable, the user can be navigated to a provider specified in the cached travel data or a carrier indicated in the response 208.

As the responses 206 are received, the data processing system 104 can provide live query results 214 to the client device to update, replace, or add to the predicted query results 212. In some embodiments, the live query results 214 are transmitted in bulk to the client device 102 at predefined intervals and/or after the final response 206 is received. To reduce the amount of data transmitted to the client device 102, the data processing system 104 can compare the live travel data received in the responses 206 with the query results 212 and can transmit only the differences to the client device 102 (e.g., differences between the predicted price and the price received in the live travel data). The predicted query results 212 and/or the live query results 214 can be stored along with the query 202 (e.g., in the database 106) as cached travel data for responding to subsequent queries.

Figure 2B:
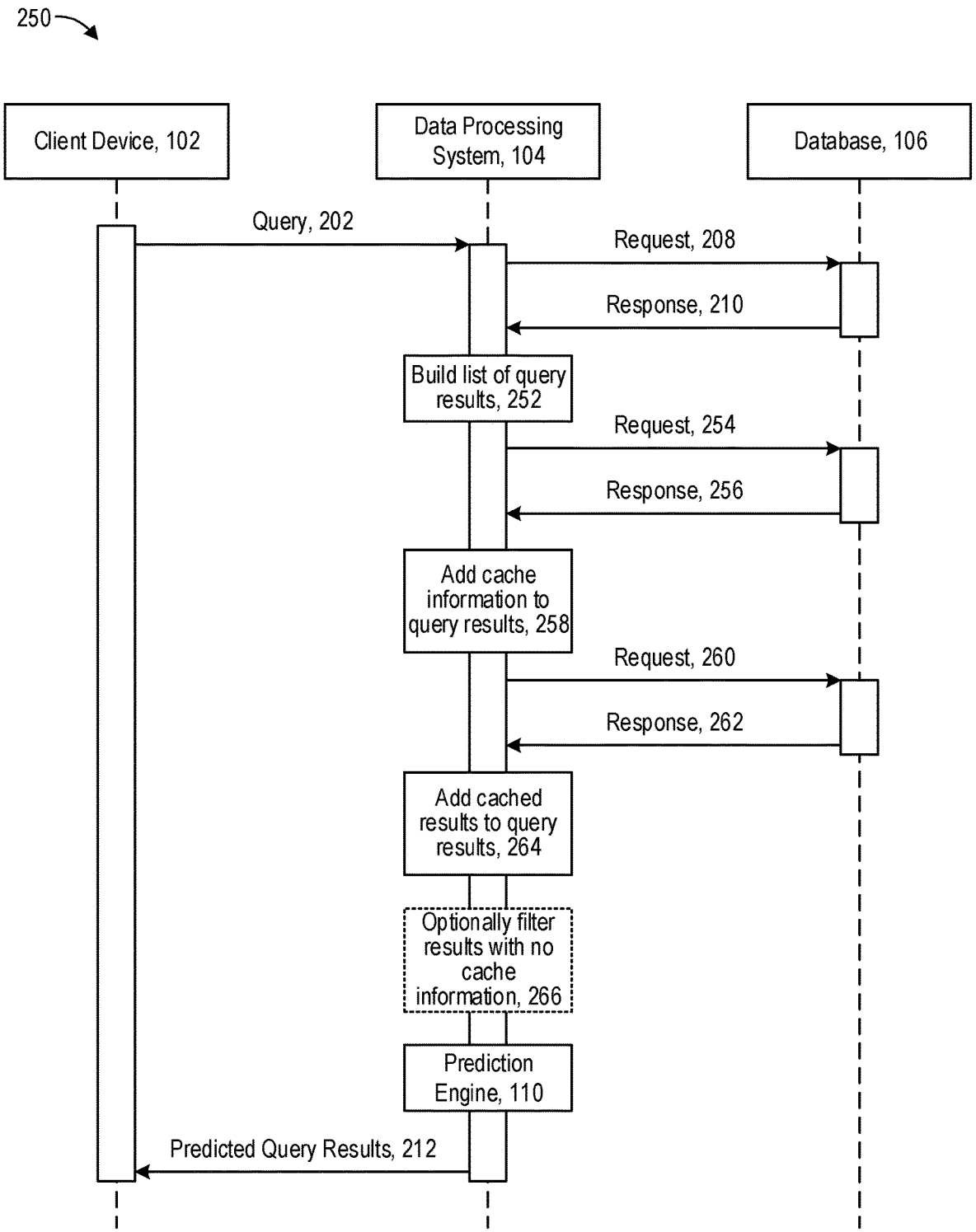

Referring to FIG. 2B, an example process 250 detailing a portion the process 200 is shown. In this example, the client device 102 transmits a query 202 to the data processing system 104. Once received, the data processing system 104 processes the query 202 to identify the query attributes and their associated values. Using this information, the data processing system 104 generates a request 208 to the database 106 storing a worldwide schedule of flights. In some embodiments, the data processing system 104 also transmits one or more requests 204 (not shown) to one or more of the travel service provider systems 108 for live travel data that satisfies the query 202.

Upon receipt of the request 208, the database 106 provides a response 210 with information for flights that satisfy the query 202. The data processing system uses the information provided in the response 210 to build 252 a list of query results. In some embodiments, building the list of query results includes mapping the results provided in the response into a particular data record format, such as a record format that can be input into the prediction engine 110. As a non-limiting example, the results can be formatted into a collection of objects (e.g., JavaScript Object Notation (JSON) objects) each having attribute-value pairs, such as "departure date":"2-22-2022", "departure city":"Boston", and the like.

In some embodiments, the data processing system 104 can leverage travel data from prior queries to enrich the list of query results with, for example, prior price, provider, and/or availability information. To facilitate this, the database 106 (which can be the same as or different from the database storing the flight schedule data) can store a cache of travel data based on recent queries. The cached travel data can be stored, for example, in the form of dataset(s) having fields representing attributes of the travel data (e.g., departure airport, departure data, arrival airport, price, provider, availability, etc.), and data records with attribute values for each cached result. In some embodiments, each cached result is stored with a unique key to facilitate lookup and retrieval. The look-back of the cache can be around two weeks, although a shorter or longer look-back can be used in some embodiments. In some embodiments, to reduce the amount of storage space required for the cache, only a subset of travel data may be stored for a given query, such as travel data corresponding to the top results for a query (e.g., the top 50 results), travel data corresponding to the cheapest result for each airline, travel data corresponding to the cheapest non-stop result (if it exists), and/or travel data corresponding to the cheapest 1 stop result (if it exists), among others.

To enrich the query results, the data processing system 104 generates a request 254 to the database 106 for cached travel data corresponding to each result. In some embodiments, the request 254 includes a unique key for each result, which allows the database 106 to identify the cached travel data corresponding to the result. The database 106 processes the request 254 and provides a response 256 with the cached travel data that matches the keys included in the request. In some embodiments, the response 256 includes a cached price (and a date/time of the price, among other information) for each matched result. After receiving the response 256, the data processing system 104 adds 258 the cached price and/or other cached information to each result for which cached data was provided. In some embodiments, adding the price and/or other cached information to a result can include adding it as an attribute-value pair within the record or object for the corresponding result.

In some embodiments, the data processing system 104 can query the cache for additional query results, such as those results that were not included in the original response 210 from the database 106 (e.g., not included in the flight schedule). To retrieve the cached results, the data processing system 104 transmits a request 260 to the database 106. The request 260 can include a key in the form of, for example, [departure airport, destination airport, departure date, return date], although other keys can be used in some embodiments. Upon receipt of the request 260, the database 106 generates a response 262 with the cached travel data that satisfies the request 260 and transmits the response to the data processing system 104. The data processing system 104 can then add 264 the cached results to the list of query results. In some embodiments, the data processing system 104 can filter out results that would likely have been included in the response 210 but weren't, as these results are considered unavailable. The data processing system 104 can also optionally filter 266 out any query results that do not have any cache information.

After being enriched with the cached travel data, each of the results are processed with the prediction engine 110 to predict the price, provider, availability and/or other live travel data for each result. The data processing system 104 uses the results and the predicted live travel data to produce the set of query results 212 that are sent to the client device 102. Upon receipt of the predicted query results 212, the client device 102 can present the results to the user using any of a variety of graphical and/or textual representations. For example, the client device 102 can display (e.g., via a browser or dedicated application) a graphical user interface with the predicted price, provider, and/or availability along with other information for each result. The results 212 can be sorted (e.g., by data processing system 104 or the client device 102) based on, for example, a lowest predicted price, shortest travel duration, or lowest number of stops, among other features. In some examples, the results 212 displayed at the client device are actionable such that selection of the result or a user interface element associated with a result navigates the user to an interface for booking the flight with the predicted provider.

In some embodiments, as responses are received from the providers with the live travel data (not shown), the data processing system 104 can provide live query results to the client device to update, replace, or add to the predicted query results 212. In some embodiments, the data processing system 104 can compare the received live travel data with the query results 212 and can transmit only the differences to the client device 102 to reduce the amount of data transmitted to the client device 102. The live and/or predicted travel data can be stored along with the corresponding query for use in responding to subsequent queries.

By leveraging predictive techniques as described herein, the system 100 can provide query results 212 having an accurate estimate of the price, provider, availability and/or other live travel data with reduced latency between the query 202 and the query results 212, relative to systems that provide query results only after receipt of the live travel data included in the responses 206. Using predictive techniques in this way can also stabilize the result set provided to the user. For example, consider a user who has submitted a query for flights that satisfy certain criteria, and has further specified that the results be sorted in a particular order (e.g., cheapest to most expensive). Because the responses 206 with live travel data may be received in a random order (e.g., not necessarily from cheapest to most expensive), a user may who is pushed live results as they are received may experience a significant amount of movement among results, which can detract from the user experience. By using predictive techniques, a stable set of query results 212 can be generated and sorted before being displayed at the client device 102, thereby eliminating movement among results and improving the user experience. In addition, because the prediction engine 110 is configured to accurately predict live travel data, live query results that are pushed to the user generally will not cause movement among the result set.

In some embodiments, the system 100 can use cache-priming techniques to improve the speed and accuracy of the query results. For example, in some embodiments, the data processing system 104 can periodically request live travel data from the travel service provide systems 108, such as live travel data for existing cache results or live travel data for popular queries, among others. The received information can then be used to create new cache entries or update existing ones for use in responding to subsequent queries.

In some embodiments, the system 100 can use live travel data from early responses 206 alone or in combination with cached data to generate the predicted query results 212. For example, the data processing system 104 can collect a predetermined number of responses 206 (e.g., the first five responses), or responses 206 received within a predetermined amount of time (e.g., within 5 seconds from transmission of the requests 204). The data processing system 104 can then add the live price and/or other live travel data for the early responses to the corresponding result, such as by adding the price and/or other live travel data as an attribute-value pair within the record or object for the corresponding result. In some embodiments, the data processing system 104 can further enrich the results with cached data, as described above. The prediction engine 110 can then use the results enriched with live travel data (and, optionally, the cached travel data) to predict the price, provider, availability, and/or other live travel data for other results. In this manner, the prediction engine 110 can be seen as providing a prediction for live travel data based in part on the live travel data received for other results. The data processing system 104 uses the predictions to produce the set of query results 212 that are sent to the client device 102.

Figure 3:
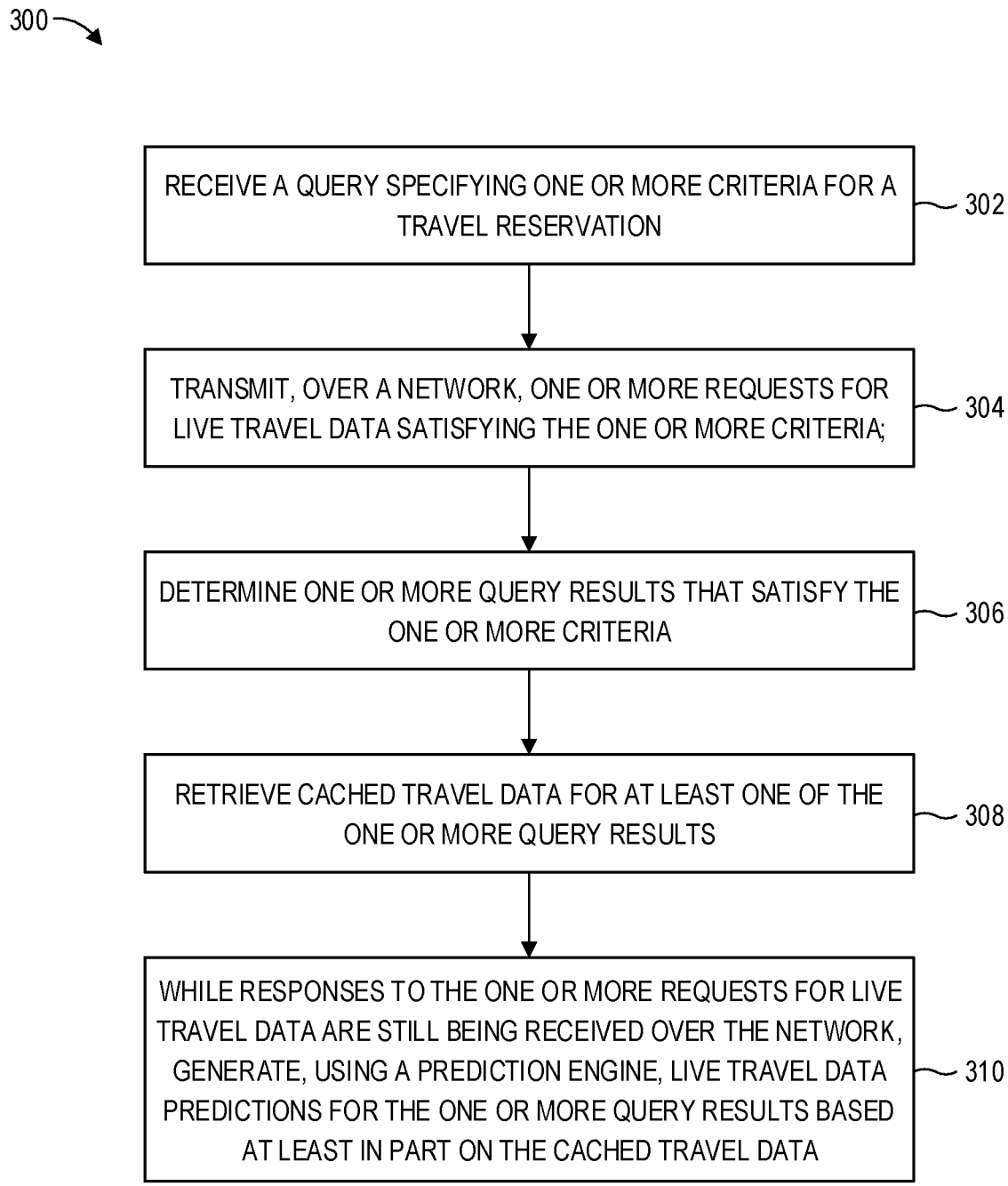
FIG. 3 illustrates an example process, in accordance with some embodiments.

FIG. 3 illustrates a flowchart of an example process 300 for reducing latency in query-based search engines, in accordance with some embodiments. For clarity of presentation, the description that follows generally describes process 300 in the context of the other figures in this description. For example, process 300 can be performed by the data processing system 104 of FIG. 1, alone or in combination with the other components of the system 100. It will be understood that process 300 can be performed, for example, by any suitable system, environment, software, hardware, or a combination of systems, environments, software, and hardware, as appropriate. In some implementations, various steps of process 300 can be run in parallel, in combination, in loops, or in any order.

Operations of the process 300 include receiving a query specifying one or more criteria for a travel reservation (302). In some embodiments, the query is received from a client device, such as the client device 102. One or more requests for live travel data that satisfies the one or more criteria specified in the query are transmitted over a network (304). For example, the data processing system 104 can transmit requests to one or more of the travel service provider systems 108 to retrieve live travel data that satisfies the query. The live travel data can include, for example, a live price, a live provider, or a live availability for the travel reservation.

One or more query results that satisfy the query are determined (306). In some embodiments, determining the one or more query results that satisfy the one or more criteria includes querying a schedule of travel reservations, such as those provided by Innovata™ or Cirium™, based on the one or more criteria included in the query.

Cached travel data for at least one of the one or more query results is retrieved (308). The cached travel data can include live travel data retrieved in response to prior queries. In some embodiments, retrieving the cached travel data for the at least one query result includes retrieving the cached travel data stored (e.g., in a database, such as the database 106) in association with a unique identifier for the at least one query result. In some embodiments, retrieving the cached travel data for the at least one query result includes retrieving the cached travel data stored in association with at least some of the one or more criteria. The cached travel data can then be used to enrich the corresponding query results, such as by storing the cached travel data in a record or object for the query result (e.g., as an attribute-value pair).

Live travel data predictions for the one or more query results are generated based at least in part on the cached travel data using a prediction engine (e.g., the prediction engine 110) (310). The live travel data predictions can include, for example, a predicted price, a predicted provider, or a predicted availability for the travel reservation. In some embodiments, the predictions are generated while the responses to some or all of the one or more requests for live travel data are still being received over the network. The prediction engine can include at least one machine learning model configured to receive the one or more query results and the cached travel data as inputs and generate the live travel data predictions as an output. In some embodiments, the prediction engine is configured to generate a confidence score for each of the live travel data predictions, the process further includes filtering the live travel data predictions having a confidence score below a threshold value.

In some embodiments, the one or more query results and the live travel data predictions are transmitted to a client device for presentation to a user. The presentation of the query results and live travel data predictions can be interactive such that a user of the client device can select a result for booking the travel reservation. In some embodiments, the one or more query results and live travel data predictions are transmitted to the client device while the responses to some or all of the one or more requests for live travel data are still being received over the network. In some embodiments, the responses to the one or more requests for live travel data are received, and the live travel data is transmitted to the client device for presentation to the user. For example, the live travel data can be used to update or otherwise replace the live travel data predictions. The live travel data can be sent at predefined intervals or as it is received. In some embodiments, only differences between the live travel data and the predicted live travel data are sent to the client device. In some embodiments, the live travel data and/or the live travel data predictions are stored in association with the one or more query results in cache for use in responding to subsequent queries.

In some embodiments, a first response to the one or more requests for live travel data satisfying the one or more criteria is received. While responses to others of the one or more requests for live travel data are still being received, live travel data predictions for the one or more query results are generated using the prediction engine based at least in part on the live travel data included in the first response (alone or in combination with the cached travel data).

Figure 4:
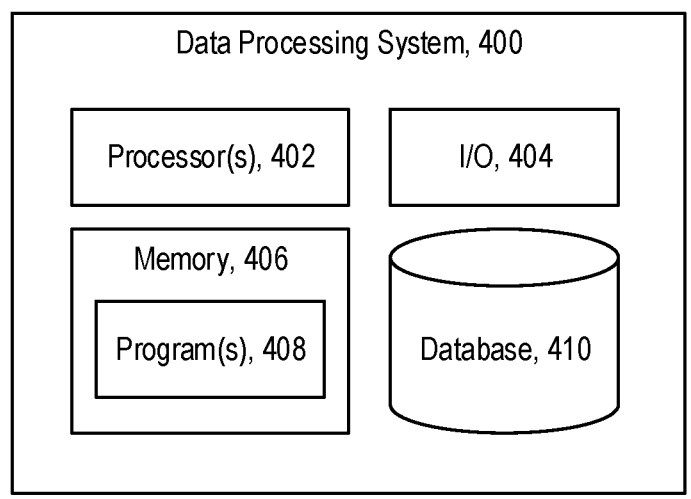
FIG. 4 illustrates an example server system, in accordance with some embodiments.

FIG. 4 shows an exemplary data processing system 400 in accordance with an aspect of the present disclosure. In some embodiments, the data processing system 400 (or variations thereof) may be or constitute one or more components of the data processing system 104, the travel service provider system(s) 108, or both. In this example, the data processing system 400 includes one or more processors 402, one or more input/output (I/O) devices 404, and one or more memories 406. In some embodiments, the data processing system 400 may be configured as an apparatus, embedded system, dedicated circuit, and the like based on the storage, execution, and/or implementation of the software instructions that perform one or more operations consistent with the disclosed embodiments. The processor 402 may include one or more known processing devices, such as a CPU, microprocessor, ASIC, or the like. The disclosed embodiments are not limited to any type of processor(s) otherwise configured to meet the computing demands required of different components of the system 100.

The memory 406 may include one or more volatile or non-volatile storage devices configured to store instructions used by processors 402 to perform functions related to disclosed embodiments. For example, the memory 406 may be configured with one or more software instructions, such as software program(s) 408, which, when executed by the processors 402, perform one or more operations consistent with disclosed embodiments. In some embodiments, the memory 406 may store sets of instructions or programs 408 to implement the prediction engine 110 configured to generate predictions for live travel data.

The data processing system 400 may also be communicatively coupled to one or more database(s) 410, which may include the database 106. Alternatively, database(s) 410 may be remote from data processing system 400, and the data processing system 400 may be communicatively coupled to database(s) 410 through a network.

Figure 5:
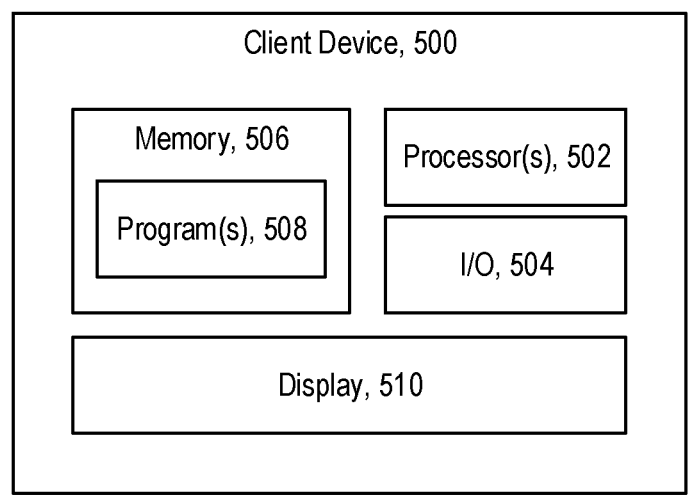
FIG. 5 illustrates an example user device, in accordance with some embodiments.

FIG. 5 shows an exemplary client device 500 in accordance with an aspect of the present disclosure. In some embodiments, the data client device 500 (or variations thereof) may be or constitute one or more components of the client device 102. In some embodiments, client device 500 may be a personal computing device, such as a smartphone, a laptop, a tablet, a smart watch, or smart glasses, among other computing devices. The disclosed embodiments are not limited to any particular configuration of the client device 500.

In this example, the client device 500 includes one or more processors 502, one or more input/output (I/O) devices 504, and one or more memories 506. The processors 502 are configured to execute software instructions stored in memory 506. The memory 506 may store one or more software instructions, such as software program(s) 508, which, when executed by the processor 502, perform one or more operations consistent with the disclosed embodiments. For example, the client device 500 may execute a browser or other program 508 that allows the client device 500 to communicate with other systems (e.g., the data processing system 104, 400), and/or to generate and display content in interfaces via display device 510 included in, or in communication with, the client device 500, among other operations.

The display device 510 may include, for example, a liquid crystal displays (LCD), a light emitting diode screens (LED), an organic light emitting diode screen (OLED), a touch screen, and other known display devices. The display device 510 may display various information to the user of the client device 500. For example, the display device 510 may display an interactive interface to the user, thereby enabling the user to operate client device 500 to perform certain aspects of the disclosed embodiments. The display device 510 may display selectable options for the user to select and may receive customer selection of options through a touch screen.

The techniques described herein can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of computation graphs. The instructions and operations can be implemented as data structures stored in a computer readable medium or other organized data conforming to a data model stored in a data repository. The software may be provided on a storage medium, such as a CD-ROM, readable by a general or special purpose programmable computer or delivered (encoded in a propagated signal) over a communication medium of a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described here. The disclosed embodiments may also be implemented as a computer-readable storage medium, configured with a computer program, where the storage medium so configured causes a computer system to operate in a specific and predefined manner to perform the functions described here.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
   receiving, from a client device, a query specifying one or more criteria for a travel reservation;
   transmitting, over a network, one or more requests for live travel data satisfying the one or more criteria;
   transmitting a request for first cached travel data in parallel to the one or more requests for live travel data;
   determining, by at least one processor, one or more query results that satisfy the one or more criteria based in part on querying a schedule of travel reservations based on the one or more criteria;
   receiving the first cached travel data;
   generating, based at least in part on the first cached travel data, a list of query results, the list of query results associated with a data record format configured to be input into a prediction engine;
   retrieving, by the at least one processor, second cached travel data for at least one of the one or more query results;
   receiving, within a predetermined period of time from transmission of the one or more requests for live travel data, a first portion of live travel data satisfying the one or more criteria;
   generating, using the prediction engine and while responses to others of the one or more requests for live travel data are still being received, live travel data predictions based at least in part on at least one of the first cached travel data, the second cached travel data and the first portion of live travel data, wherein the prediction engine includes one or more machine learning models configured to receive the first cached travel data, the second cached travel data and the first portion of live travel data as input and generate the live travel data prediction as output; and
   transmitting the live travel data predictions to the client device for presentation to a user.

2. The method of claim 1, wherein retrieving the second cached travel data for the at least one of the one or more query result comprises retrieving the second cached travel data stored in association with a unique identifier for at least one query result.

3. The method of claim 1, wherein retrieving the second cached travel data for the at least one of the one or more query result comprises retrieving the second cached travel data stored in association with at least some of the one or more criteria.

4. The method of claim 1, wherein the prediction engine is configured to generate a confidence score for each of the live travel data predictions, the method further comprising filtering the live travel data predictions having a confidence score below a threshold value.

5. The method of claim 1, further comprising:
   storing the live travel data in association with the one or more query results in cache.

6. The method of claim 1, wherein the live travel data predictions for the one or more query results comprise at least one of a predicted price, a predicted provider, or a predicted availability for the travel reservation.

7. The method of claim 1, the method further comprising:
receiving, after the live travel data predictions have been transmitted to the client device, a second portion of live travel data in response to the one or more requests for live travel data, and
transmitting the second portion of live travel data to the client device for presentation.

8. The method of claim 7, further comprising:
updating the live travel data predictions based at least in part on receiving the second portion of live travel data.

9. The method of claim 1, the method further comprising:
receiving, after the live travel data predictions have been transmitted to the client device, a second portion of live travel data in response to the one or more requests for live travel data;
determining differences between the live travel data predictions and the second portion of live travel data; and
transmitting the differences to the client device for presentation.

10. The method of claim 1, further comprising
retraining the one or more machine learning models associated with the prediction engine based at least in part on the one or more query results and the live travel data received in response to the one or more requests for live travel data.

11. The method of claim 1,
wherein the first portion of the travel data comprises at least one of a live price, a live provider, or a live availability for the travel reservation.

12. The method of claim 1,
wherein the prediction engine is trained based at least in part on historical travel data, the historical travel data comprising historical flight data, historical price data, historical provider data.

13. The method of claim 1, wherein the first portion of live travel data comprises a predetermined number of responses to the one or more requests for live travel data.

14. The method of claim 1, the method further comprising:
sorting the live travel data predictions based at least in part on a lowest predicted price, a shortest travel duration, or a lowest number of stops.

15. The method of claim 1, wherein the second cached travel data comprises one or more of prior price data, provider data, or availability data.

16. The method of claim 1, further comprising: storing a subset of the live travel data in association with the one or more query results in cache.

17. The method of claim 1, wherein the schedule of travel reservations is associated with a third-party database.

18. A system, comprising:
at least one processor; and
memory storing instructions executable by the at least one processor to perform operations comprising:
receiving, from a client device, a query specifying one or more criteria for a travel reservation;
transmitting, over a network, one or more requests for live travel data satisfying the one or more criteria;
transmitting a request for first cached travel data in parallel to the one or more requests for live travel data;
determining one or more query results that satisfy the one or more criteria based in part on querying a schedule of travel reservations based on the one or more criteria;
receiving the first cached travel data;
generating, based at least in part on the first cached travel data, a list of query results, the list of query results associated with a data record format configured to be input into a prediction engine;
retrieving second cached travel data for at least one of the one or more query results;
receiving, within a predetermined period of time from transmission of the one or more requests for live travel data, a first portion of live travel data satisfying the one or more criteria;
generating, using the prediction engine and while responses to others of the one or more requests for live travel data are still being received, live travel data predictions based at least in part on at least one of the first cached travel data, the second cached travel data and the first portion of live travel data, wherein the prediction engine includes one or more machine learning models configured to receive the first cached travel data, the second cached travel data and the first portion of live travel data as input and generate the live travel data prediction as output; and
transmitting the live travel data predictions to the client device for presentation to a user.

19. The system of claim 18, wherein determining the one or more query results that satisfy the one or more criteria comprises querying a schedule of travel reservations based on the one or more criteria.

20. A non-transitory computer-readable storage medium storing instructions executable by at least one processor to perform operations comprising:
receiving, from a client device, a query specifying one or more criteria for a travel reservation;
transmitting, over a network, one or more requests for live travel data satisfying the one or more criteria;
transmitting a request for first cached travel data in parallel to the one or more requests for live travel data;
determining one or more query results that satisfy the one or more criteria based in part on querying a schedule of travel reservations based on the one or more criteria;
receiving the first cached travel data;
generating, based at least in part on the first cached travel data, a list of query results, the list of query results associated with a data record format configured to be input into a prediction engine;
retrieving second cached travel data for at least one of the one or more query results;
receiving, within a predetermined period of time from transmission of the one or more requests for live travel data, a first portion of live travel data satisfying the one or more criteria;
generating, using the prediction engine and while responses to others of the one or more requests for live travel data are still being received, live travel data predictions based at least in part on at least one of the first cached travel data, the second cached travel data and the first portion of live travel data, wherein the prediction engine includes one or more machine learning models configured to receive the first cached travel data, the second cached travel data and the first portion of live travel data as input and generate the live travel data prediction as output; and transmitting the live travel data predictions to the client device for presentation to a user.

\* \* \* \* \*